Aug. 23, 1938.  C. D. STROMGREN  2,127,893
PISTON RING GROOVE AND LAND TOOL
Filed April 3, 1936  2 Sheets-Sheet 1

Inventor
Charles D. Stromgren

By [signature]
Attorney

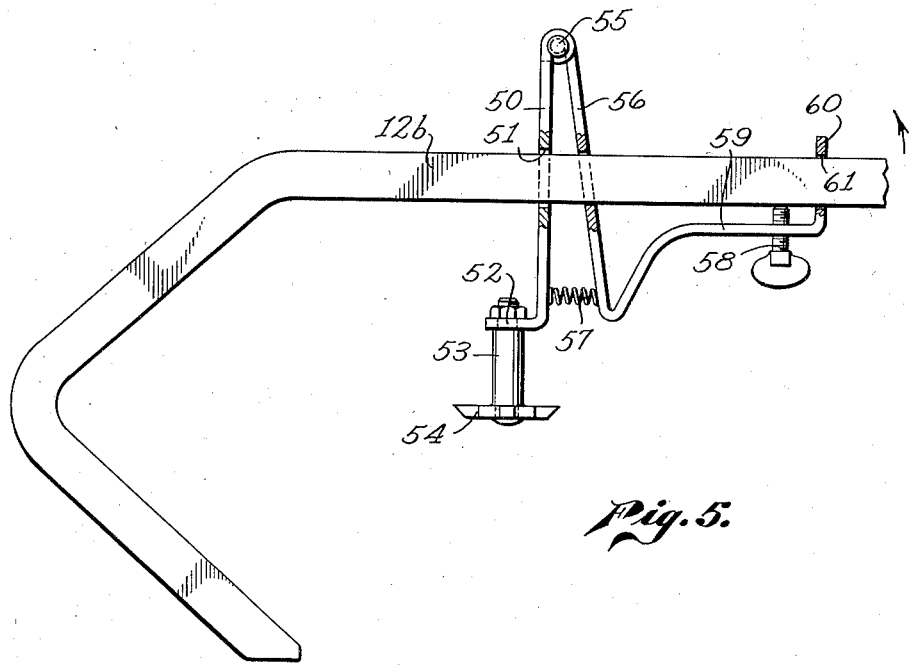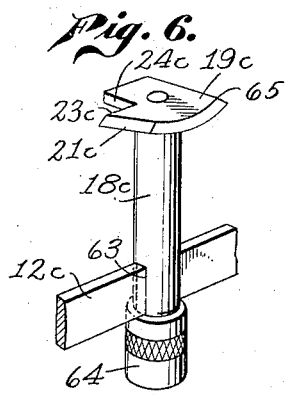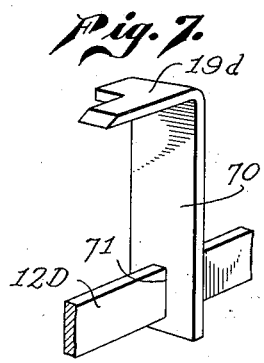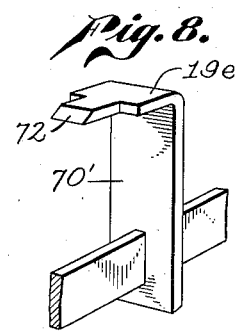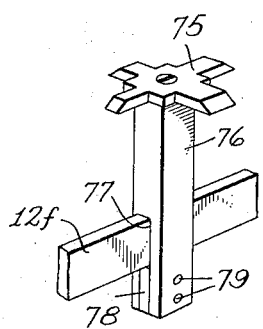

Patented Aug. 23, 1938

2,127,893

UNITED STATES PATENT OFFICE 2,127,893

PISTON RING GROOVE AND LAND TOOL

Charles D. Stromgren, Los Angeles, Calif.

Application April 3, 1936, Serial No. 72,587

13 Claims. (Cl. 82—4)

This invention has to do in a general way with tools designed for use in connection with the replacement of piston rings in the pistons of internal combustion engines and the like and is more particularly related to improvements in tools of the general character shown and described in United States Letters Patent No. 2,018,930 issued to me on October 29, 1935.

The tool shown and described in my patent, above referred to, is designed for use in scraping the carbon from and in deepening the ring grooves of a piston so as to better accommodate new piston rings or to permit the installation of piston ring expanders.

The present invention has as its primary object the production of a tool which is similar in its principle of operation to the tool shown in the patent referred to above but which incorporates an improved cutter adapted for use in bevelling or chamfering the lands adjacent the grooves. This cutter is preferably used in conjunction with a tool of the type shown in my patent referred to above and the chamfering or bevelling of the bottom lands adjacent the ring grooves makes for improved oil control giving a "scraping" gland effect to the ordinary compression rings and providing an oil accumulating and sealing groove or recess for all of the rings. The objects and advantages of chamfering the lands will be immediately apparent to those familiar with the art and it is a primary object of this invention to provide a tool for this purpose which can be employed to quickly and accurately bevel the lands with a minimum of effort and expense as contrasted with prior practice in which attempts have been made to accomplish this result by means of files, emery wheels or through the use of a lathe.

It is a further object of this invention to provide a cutter of the class described which can be used in conjunction with all of the various widths of piston grooves common to automotive and internal combustion engine practice.

My invention contemplates the use of a frame or handle member similar to that shown and described in my patent referred to above and it is one important feature of the cutter contemplated by this invention that such cutter is provided with a guide shoulder situated and arranged so as to co-operate with the guide portion of the handle member so as to hold it in proper alignment with the edge of the groove during the bevelling or chamfering operation.

It is a further object of this invention to provide an improved combination cutter and cutter post which lends itself particularly to tools of the type shown in my patent referred to above and which may incorporate a cutting edge designed for chamfering the lands or a cutting edge designed for use in scraping or deepening the grooves. The improved cutter post or cutter mounting contemplated by this invention makes for a cheaper construction and provides a construction in which the inherent resiliency of the cutter post may be utilized to maintain the proper pressure between the cutting edge and the engaged surface on the piston.

With regard to the chamfering cutter referred to above, it is a still further object of this invention to provide such a cutter in which the guide surface referred to is formed so as not to injure the face or wall on the piston groove with which it comes in contact.

The details in the construction of certain preferred forms of my invention, together with other objects attending its production will be best understood from the following description of the accompanying drawings which are chosen for illustrative purposes only and in which—

Fig. 5 is a fragmentary plan view showing still another modified form of cutter and post assembly.

Figs. 6, 7, 8 and 9 are all fragmentary perspective views illustrating various modified forms of cutter and post assemblies contemplated by this invention.

Figure 1:
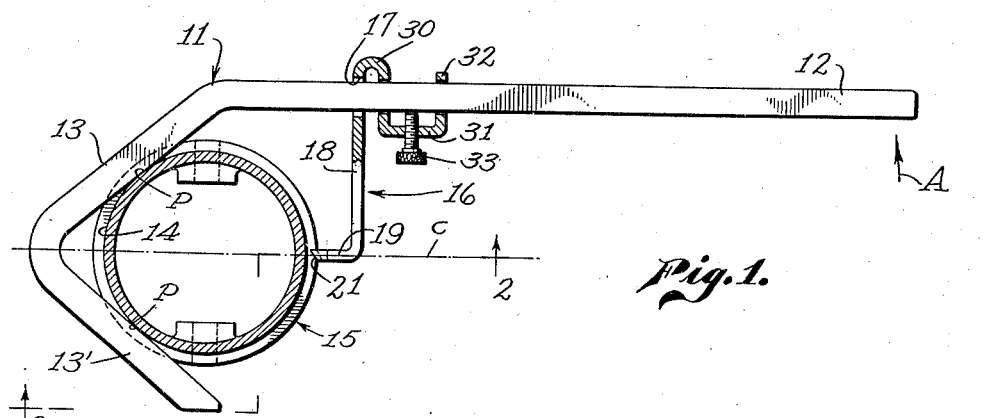
Fig. 1 is a plan view with parts broken away showing a preferred form of cutter and post assembly contemplated by this invention equipped with a chamfering cutting edge, such tool being shown in operative relation with a piston.

More particularly describing the invention as herein illustrated, reference numeral 11 indicates what I may term a frame member which is shown as comprising a flat metal bar having a straight handle section 12 and what I may term a guide section 13—13', this last mentioned section being formed by bending a portion of the bar back upon itself as an angle. This angle, comprised of legs 13 and 13' is positioned so that its bisector C is parallel to the straight handle section 12. The legs 13 and 13' of the guide section are, as pointed out above, formed of a flat metal bar of a width such that it can readily be received in the grooves of a piston. In this way the guide section will engage the inner vertical face of a groove 14 on a piston 15 at two points indicated at P and P'.

Slidably mounted on the straight handle portion 12 is what I may term a cutter and post assembly generally indicated by reference numeral 16. This cutter and post assembly is shown as comprising a metal strap or an elongated metal plate preferably having a certain amount of inherent resiliency such as is found in steel, such strap or plate being apertured as indicated at 17 to slidably receive the straight handle portion 12. The inner end of the straight portion 18, of the plate, which I may term a post member is shown as being bent inwardly toward the guide section 13, 13'. In this form of my invention this bent portion which is indicated by reference numeral 19 and which constitutes a cutter member, is shown as being located in the plane of the bisector C of the angle between the legs 13 and 13'. With such an arrangement the cutter always bears the same angular relation to the engaged surface on the piston irrespective of the piston's diameter.

Figure 2:
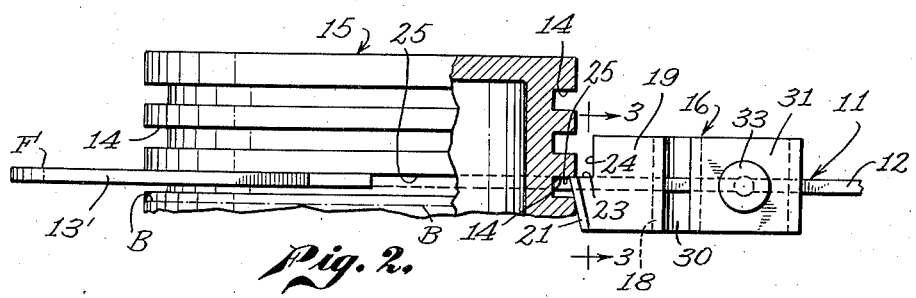
Fig. 2 is an enlarged fragmentary sectional elevation taken along the line 2—2 of Fig. 1.
Figure 3:
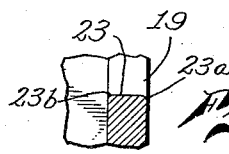
Fig. 3 is an enlarged fragmentary sectional view taken in a plane represented by the line 3—3 of Fig. 2.

As was pointed out above, the cutter shown in Fig. 1 is designed for use in chamfering the land adjacent the ring groove engaged by the guide section 13, 13' and the form of cutter employed for this purpose is best illustrated in Figs. 2 and 3. Referring to Fig. 2 it will be understood that the cutter head 19 is provided with a cutting edge 21 which is inclined downwardly and outwardly away from the vertical wall of the piston so as to bevel the corner of the land adjacent the groove in the manner generally indicated in broken lines at B. This cutting edge 21 is made of a length such that it will accommodate piston grooves of the various widths employed in automotive and internal combustion engine pistons.

For the purpose of maintaining the cutting edge of the head 19 in proper relation to the land being operated upon at all times, I show the cutting edge 21 as terminating at its upper end in a shoulder 23 which is formed by cutting out a notch 24 in the cutter head. This shoulder 23 is preferably positioned in the same plane which contains the upper face F of the frame or bar member 11 and is adapted to engage the inside wall or face 25 of the groove 26, the face 25 so engaged being oppositely disposed to the land upon which the cutting edge 21 is operating. In other words, the shoulder 23 always rides against the inside face of the piston groove which is opposite to the land that is being chamfered.

In order that the shoulder 23 may have no injurious effect upon the groove wall or face which it engages during this guiding action, I consider it preferable to grind down or otherwise round the corners of this shoulder as indicated at 23a and 23b in Fig. 3.

It will be seen from the construction as described so far, that the post member 18 which carries the cutter head 19 on its inner end has sufficient inherent resiliency to apply the proper pressure at the cutting edge when the supported end of the post is held at a predetermined point on the handle. Various means may be employed for mounting this post on the handle and in Fig. 1 I show a preferred form of such construction in which the outer end of the post section 18 is shown as being provided with a U bend 30, the end of such bend terminating in a flat section 31 which is followed by another angle bend 32. The aperture 17 in the post section 18 is shown as being of greater width than the bar 12 to permit a substantial angular movement of the post section without engaging the bar, the U bend adding to the resiliency of the post section to obtain the desired pressure. In this form of my invention, the post assembly is locked at various positions of adjustment along the handle section 12 through the medium of a set screw 33 which is in threaded engagement with a properly situated opening in the flat section 31.

In operating this form of my invention the set screw 33 is first loosened and the post and cutter assembly is moved outwardly along the handle member 12 to permit the placement of the guide section in the groove of a piston. The post assembly is then advanced toward the piston until the cutting edge 21 bears against the land adjacent the engaged groove with the desired pressure. The set screw is then tightened against the bar and the handle is rotated in the general direction of the arrow A until the desired bevel or chamfer is obtained. In usual practice one or two turns about the piston will accomplish the desired result.

Figure 2A:
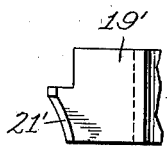
Fig. 2a is a fragmentary elevation showing a modified form of chamfering cutter head contemplated by this invention.

In Fig. 2a I show a modified form of cutter head designed particularly for use in cutting a curved chamfer or bevel adjacent a very narrow groove. In this form of my invention it will be observed that the cutting edge 21' of the head 19' is formed on a curve rather than a straight incline.

Figure 4:
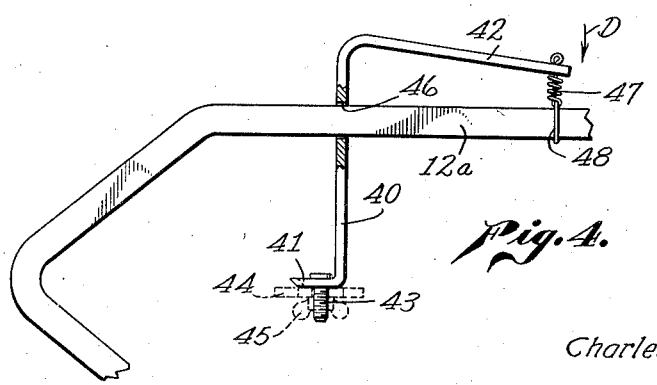
Fig. 4 is a fragmentary plan view partly in section illustrating a modified form of cutter and post assembly contemplated by this invention.

In Fig. 4 I show another modified form of metal strip or plate bent to a distorted Z shape so as to provide what I may term a post section 40, a forwardly bent cutter section 41 and a rearwardly bent pressure applying section 42. The cutter section 41 is shown as being equipped with a threaded pin 43 adapted to support a groove cleaning and deepening cutter indicated in broken lines at 44, such cutter being held in place on the pin through the medium of a wing nut 45. The post section 40 is provided with an aperture 46 near its outer end, this aperture being of a size such that it has sliding engagement with the handle section 12a. The post member may be held against movement on the bar 12a and in pressure engagement with the piston engaged thereby by the application of pressure in the direction of the arrow D on the member 42, such pressure being applied either by hand or through the medium of a tension spring 47 which has a hook 48 movably mounted on the handle 12a. The invention is meant to include any post member approximating a Z shape and is not limited to the exact proportions shown in the drawings.

In Fig. 5 I show another cutter and post assembly which may be considered as a modification of the form shown in Fig. 1. such assembly comprising a post section 50, having an aperture 51 of slightly greater width than the bar 12b through which such bar extends and provided at its inner end with a projection 52 which carries a pin 53 upon which a cutter 54 is mounted. The lower end of the post member 50 is connected through the medium of a hinge joint 55 with a locking section 56 so as to constitute a modified U bend or a V portion. The two sections 50 and 56 are yieldably biased away from each other by means of a compression spring 57 and the section 56 is adapted to be adjustably locked to the bar through the medium of a set screw 58 which is mounted in an extension 59 such extension having an angle portion 60 which is apertured at 61 to receive the bar 12b.

In Fig. 6 I show a modified form of chamfering cutter designed for use in connection with a post 18c. This post has an open slot 63 at its lower end, such lower end being threaded for the reception of a nut 64 whereby it is locked to the bar 12c extending through the slot. The cutter head 19c is shown as comprising a plate riveted or otherwise rigidly secured to the post, such plate having a notch 24c forming a guide shoulder 23c from which the inclined cutting edge 21c extends.

Fig. 7 shows a simplified form of cutter and post assembly of the general type shown in Fig. 1, such assembly consisting merely of a flat post member 70 having an aperture 71 of the same size as the bar 12D and provided with a cutter head 19d similar to the cutter head 19 described above. The post may be manually held in the desired position on the handle by the operator.

In Fig. 8 I show a cutter and post assembly similar to the one shown in Fig. 7 except for the fact that the post member 70' is provided with a head 19e on which the cutter 72 is formed as a forwardly extending tongue which is designed for use in cleaning or deepening the ring grooves.

In Fig. 9 I show another modified form of post construction designed for use in conjunction with a cutter 75 or with a cutter of the type indicated at 19c in Fig. 6. This post which is indicated by reference numeral 76 is provided with a slot 77 at its lower end to receive the bar 12f, the bar and post being held in assembled relation with each other through the medium of a block 78 which is rigidly held in the bottom of the slot by means of rivets 79.

It is to be understood that while I have hereinabove referred to the particular type of frame member shown in Fig. 1 as a preferred construction that other types of frames may be employed for supporting cutter and post assembly. It is also to be understood that, while I have described certain preferred forms of the cutter and post assembly, in conjunction with the chamfering type of cutter, these post assemblies also lend themselves to use with equal advantages to groove deepener tools. Likewise, although I have referred to the chamfering cutter particularly in connection with certain preferred forms of post assemblies it is to be understood that my invention is not limited to the precise forms or combination of elements illustrated herein but includes within its scope whatever changes fairly come within the spirit of the appended claims.

I claim as my invention:

1. A tool for beveling the ring groove lands of a piston embodying: a frame piece having a handle section and a guide section adapted to engage in a ring groove at two angularly spaced points; a post member mounted on said handle section and extending inwardly toward a piston engaged in said guide section; a cutter on said post, said cutter having an inclined cutting edge adapted to engage the land adjacent the groove containing said guide and a shoulder on said cutter adapted to engage the side wall of said groove opposite the engaged land, said cutting edge and said shoulder forming an acute angle, said shoulder being provided with rounded edges; and means for adjusting said cutter to vary the inclination of the cutting edge.

2. A tool of the class described embodying: a frame piece having a handle section and a guide section adapted to engage in a piston ring groove at two angularly spaced points; a resilient post member mounted on said handle section for longitudinal adjustment along said handle, said post extending inwardly toward the region occupied by a piston engaged by said guide portion; and a cutter on the inner end of said post member adapted to engage the piston groove occupied by said guide section.

3. A tool of the class described embodying: a frame piece having a handle section and a guide section adapted to engage in a piston ring groove at two angularly spaced points; a resilient post member mounted on said handle section for longitudinal adjustment along said handle, said post extending inwardly toward the region occupied by a piston engaged by said guide portion; a cutter on the inner end of said post member adapted to engage the piston groove occupied by said guide section and means for locking said post member against longitudinal movement along said handle section.

4. A tool of the class described embodying: a frame piece having a handle section and a guide section adapted to engage in a piston ring groove at two angularly spaced points; a resilient post member mounted on said handle section for longitudinal adjustment along said handle, said post extending inwardly toward the region occupied by a piston engaged by said guide portion; and a cutter on the inner end of said post member adapted to engage the piston groove occupied by said guide section said post member comprising a flat metal strap having an aperture at its outer end to slidably receive said handle section.

5. A tool of the class described embodying: a frame piece having a handle section and a guide section adapted to engage in a piston ring groove at two angularly spaced points; a resilient post member mounted on said handle section for longitudinal adjustment along said handle, said post extending inwardly toward the region occupied by a piston engaged by said guide portion; and a cutter on the inner end of said post member adapted to engage the piston in the region of the groove occupied by said guide section said post member comprising a flat metal strap having an apertured U bend at its outer end to slidably receive said handle section.

6. A tool of the class described embodying: a frame piece having a handle section and a guide section adapted to engage in a piston ring groove at two angularly spaced points; a resilient post member mounted on said handle section for longitudinal adjustment along said handle, said post extending inwardly toward the region occupied by a piston engaged by said guide portion; and a cutter on the inner end of said post member adapted to engage the piston in the region of the groove occupied by said guide section, said post member comprising a flat metal strap having an apertured U bend at its outer end to slidably receive said handle section, and means associated with said U bend for locking said post member on said handle section.

7. A tool of the class described embodying: a frame piece having a handle section and a guide section adapted to engage in a piston ring groove at two angularly spaced points; a resilient post member mounted on said handle section for longitudinal adjustment along said handle, said post extending inwardly toward the region occupied by a piston engaged by said guide portion; and a cutter on the inner end of said post member adapted to engage the piston in the region of the groove occupied by said guide section, said post member comprising a flat metal strap having apertured means at its outer end to slidably receive said handle section and the inner end of said post being bent to form said cutter.

8. A tool of the class described embodying: a frame piece having a handle section and a guide section adapted to engage in a piston ring groove at two angularly spaced points; a resilient post member mounted on said handle portion for longitudinal adjustment along said handle, said post extending inwardly toward the region occupied by a piston engaged by said guide portion; a cutter on the inner end of said post member adapted to engage the piston in the region of the groove occupied by said guide section, said post member comprising a flat metal strap having apertured means at its outer end to slidably receive said handle section, the inner end of said strap being bent to form said cutter; and means associated with said cutter for the attachment of auxiliary cutting means thereto.

9. A tool of the class described embodying: a frame piece having a handle section and a guide section adapted to engage in a piston ring groove at two angularly spaced points; a resilient post member mounted on said handle section for longitudinal adjustment along said handle, said post extending inwardly toward the region occupied by a piston engaged by said guide portion; and a cutter on the inner end of said post member adapted to engage the piston in the region of the groove occupied by said guide section, said post member comprising a flat metal strap of substantially Z shaped configuration having an aperture near its outer end to slidably receive said handle section, said cutter being formed on the inner bent end of said strap and the outer bent end of said strap comprising a pressure applying member.

10. A tool of the class described embodying: a frame piece having a handle section and a guide section adapted to engage in a piston ring groove at two angularly spaced points; a resilient post member mounted on said handle section for longitudinal adjustment along said handle, said post extending inwardly toward the region occupied by a piston engaged by said guide portion; and a cutter on the inner end of said post member adapted to engage the piston in the region of the groove occupied by said guide section, said post member comprising a flat metal strap having an apertured U bend at its outer end to slidably receive said handle section, and means associated with said U-bend for locking said post member on said handle section, said U-bend being comprised of two sections hinged together, and a compression spring between said hinged sections.

11. A tool of the class described embodying: a straight flat frame bar having one end bent back upon itself to form a guide section having two spaced piston engaging points and a post and cutter member mounted on said bar, said last mentioned member comprising an elongated metal plate having one end apertured for sliding support on said bar and having its other end bent forwardly to provide a cutting edge adapted to engage a piston oppositely of the bent guide portion on said frame bar.

12. A tool of the class described embodying: a frame piece having a handle section and a guide section adapted to engage in a piston ring groove at two angularly spaced points; a resilient post member mounted on said handle section for longitudinal adjustment along said handle, said post member extending inwardly toward the region occupied by a piston engaged by said guide section; a cutter on the inner end of said post member adapted to engage the piston in the region of the groove occupied by said guide section, said post member comprising two flat metal straps hingedly connected to form a V at the outer end of said post, said straps being apertured to slidably receive said handle section; means for locking said post on said handle section; and a compression spring between said hinged straps.

13. For use in combination with a tool having a frame and a cutter post, a cutter member carried by said post and having an inclined beveled cutting edge engaging the outer surface of a land adjacent a ring groove of a piston to bevel said land and being of sufficient width to extend across the groove next adjacent to the engaged land, a shoulder having a guide face formed at one end of said cutting edge, said face engaging the opposed side wall of the next adjacent land, said shoulder and cutting edge being disposed so as to form an acute angle, and means for mounting the cutter so that the plane of the cutter is disposed substantially at right angles to the piston lands.

CHARLES D. STROMGREN.